Figure 1:
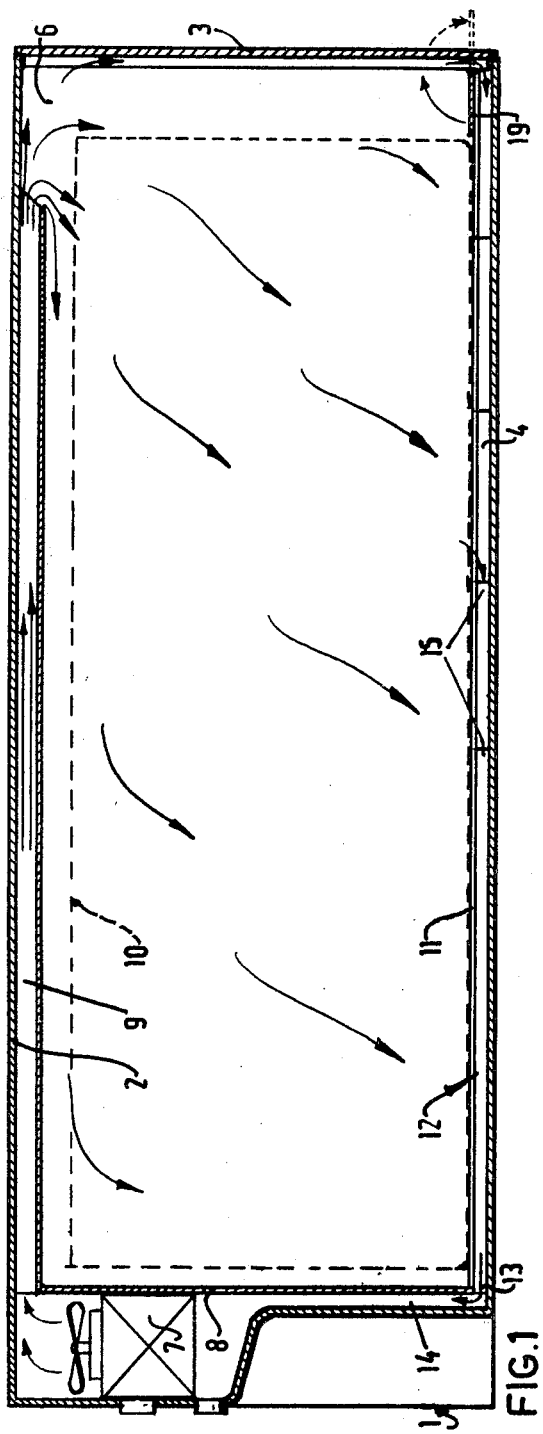

United States Patent [19]
Exler

[11] 4,143,588
[45] Mar. 13, 1979

[54] CONTAINER COMPRISING AN IMPROVED FLOOR STRUCTURE

[76] Inventor: Petrus A. T. Exler, Stadhoudersing 70, Zoetermeer, Netherlands

[21] Appl. No.: 821,191

[22] Filed: Aug. 2, 1977

[30] Foreign Application Priority Data

Aug. 3, 1976 [NL] Netherlands .................. 7608639

[51] Int. Cl.² .................. B65J 1/02; F24F 13/00
[52] U.S. Cl. .................. 98/6; 98/33 A; 98/52; 220/1.5; 34/225
[58] Field of Search .................. 98/2, 2.14, 2.15, 6, 98/33 A, 52–56; 34/225; 432/500; 220/1.5, 9 B, 15; 62/239, 243

[56] References Cited

U.S. PATENT DOCUMENTS

| 712,327 | 10/1902 | Pancoast | 98/6 |
|---|---|---|---|
| 1,814,979 | 7/1931 | Taylor | 98/33 A |
| 2,260,999 | 10/1941 | Mann | 98/6 |
| 2,274,162 | 2/1942 | Preble | 98/6 |
| 2,281,625 | 5/1942 | Skinner | 34/225 |
| 3,092,220 | 6/1963 | Black | 98/6 |
| 3,143,952 | 8/1964 | Simons | 98/6 |
| 3,387,387 | 6/1968 | Perry, Jr. | 34/225 |
| 3,855,451 | 12/1974 | Lee | 34/225 |

Primary Examiner—Henry C. Yuen
Attorney, Agent, or Firm—John P. Snyder

[57] ABSTRACT

A container for goods transport comprising a device for producing a ventilation stream across the loading space so that at any point in the loading space the same desired temperature and degree of humidity will prevail; the improvement is related to, a plurality of closed channels of variable length, one open end of which opens out in a conduit communicating with the ventilation device are arranged on part of the floor of the loading space and a plurality of upright partitions leading towards the other open end of the channels and having the same height as the channels are arranged on the remaining part of the floor.

5 Claims, 4 Drawing Figures

CONTAINER COMPRISING AN IMPROVED FLOOR STRUCTURE

The invention relates to a container for goods transport comprising a device for producing a ventilation stream across the loading space.

Hitherto containers are known in which the loading space is brought to "deepfreeze" temperature, whilst the ventilation stream is of a restricted nature. For such a container it has been proposed to guide the ventilation stream round about the loading space in order to produce an insulation cushion around it.

The invention has for its object to produce a ventilation stream across the loading space so that at any point in the loading space the same desired temperature and degree of humidity will prevail. The problem involved is that the cargo is each time stowed in a different manner in the container so that the ventilation stream flows along a "shortcircuit path" along the cargo, as a result of which the required conditions cannot be maintained in the cargo.

The invention provides a container in which the same temperature and the same degree of humidity can be maintained at any spot in the loading space. For this purpose the invention provides a container in which a plurality of closed channels of variable length, one open end of which opens out in a conduit communicating with the ventilation device are arranged on part of the floor of the loading space and a plurality of upright partitions leading towards the other open end of the channels and having the same height as the channels are arranged on the remaining part of the floor.

Although the ventilation stream may also flow in the opposite sense, it will now be assumed that the air is sucked out of the loading space through the channels on the floor. Owing to the varying lengths of the channels it is now possible to suck away air near the floor out of the loading space independently of the proportions of the container. The partitions serve to guide the air present at the remaining floor portion towards the channels and to hold the cargo at a distance from the floor proper of the container and to form an uninterrupted loading floor together with the top surfaces of the closed channels.

Experiments with a floor structure in which the channels and the partitions are arranged in groups in specular fashion with respect to the central, longitudinal plane of the container have shown that with a supply of fresh ventilation air up in the ceiling surprisingly a single supply opening appears to be sufficient, said opening being advantageously located above the floor portion provided with the standing partitions. These experiments have furthermore shown that irrespective of the shape of the cargo and of the nature of the cargo and irrespective of the stowing mode an optimum control of temperature and humidity in the loading space is obtained.

Further features of the invention will be described more fully hereinafter with reference to an embodiment.

Figure 2:
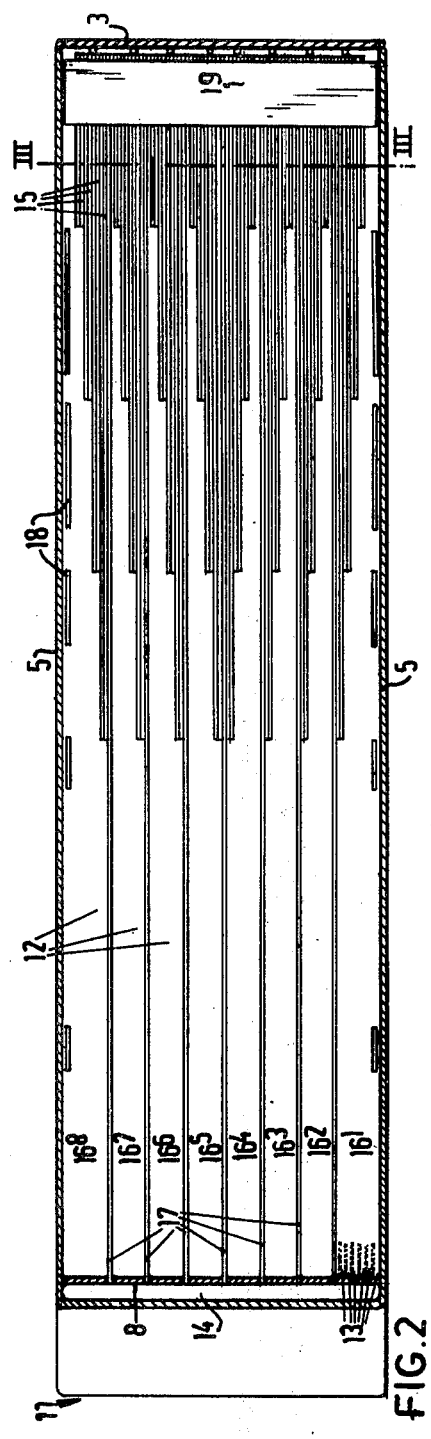
Figures 3, 4:
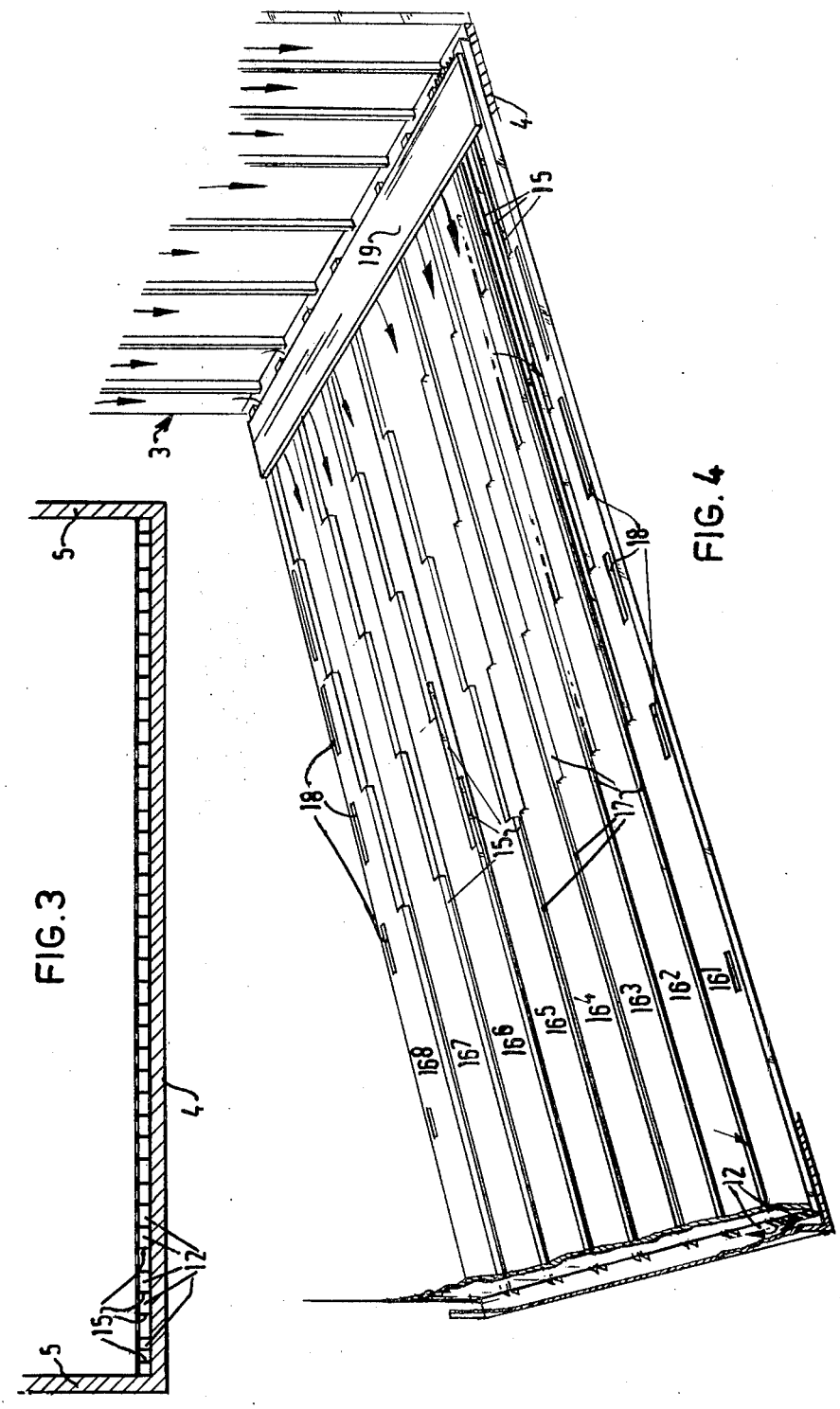

In the drawings:

FIG. 1 is a longitudinal sectional view of a container ventilated in accordance with the invention, FIG. 2 is a plan view of the floor structure in the container shown in FIG. 1, FIG. 3 is a sectional view taken on the line III—III in FIG. 2, FIG. 4 is a perspective elevational view of part of the floor and the rear wall of the container shown in FIG. 1.

The container shown in the Figures comprises a front wall 1, a top wall 2, a rear wall 3 forming a door and a bottom 4 and two sidewalls 5. The device 7 for producing a ventilation stream is separated from the loading space 6 proper by means of a partition wall 8. On the top and bottom sides the partition wall 8 has passages for the inlet and outlet of air into and out of the loading space 6. The air stream can be supplied by means of a single feeding channel 9, which is suspended centrally of the ceiling 2 of the container and which has an outlet opening near the rear wall 3. The air passes across the loading space 6 and the cargo 10 stored therein, indicated by the broken line and arrives at a floor structure 11 according to the invention on the bottom 4 of the container. The flow is indicated in FIG. 1 by arrows. It will be obvious that fresh air can be supplied from without through additional flaps, whereas exhaust air can be conducted away to the outside.

The floor structure embodying the invention is shown in detail in FIGS. 2, 3 and 4. It mainly comprises closed channels 12 of unequal lengths, which is clearly shown in FIG. 2. One open end 13 of all channels opens out in a common main channel or main conduit 14, which leads towards the ventilation device 7. In this embodiment the main channel 14 is at right angles to the channels 12 mounted on the bottom 4. The floor structure furthermore comprises standing partitions 15, shown in the form of a T-profile in FIG. 3 for this embodiment. The height of the partitions is equal to that of the channels 12 so that on the bottom 4 a smooth loading floor is formed by the flange of the T-profile and the top walls of the channels 12.

FIG. 2 shows that the channels 12 and the partitions 15 are united in groups 16, this embodiment comprising eight of them, designated by $16_1, \ldots 16_8$. With respect to the central, longitudinal plane A—A these groups are disposed in specular fashion on the bottom so that at any cross-section of the loading space the air present is subjected to symmetrical suction.

As a result of the unequal lengths of the channels in a group the suction in a longitudinal plane of the container will be performed asymmetrically, though uniform ventilation in the longitudinal plane will be obtained. From FIG. 2 it will be seen that the side of the container nearest the ventilation device has a bottom, the top surface of which is substantially completely closed. Drainage of the air present at said side is ensured only by disposing the groups of channels 16 at a given distance from one another so that an open gap 17 covers the full length of the container, which gap provides the sole possibility of conducting air directly from the loading space towards the main conduit 14 of the ventilation device. All further ventilation air is guided via the spaces between the partitions 15 and the channels 12, from where it is conducted via the main channel 14 towards the ventilation device.

It should be noted that the drainage of air from the loading space takes place mainly in the portion of the loading space furthest remote from the ventilation device, which is surprising since the supply of air takes place also in said portion. In practice it has been found that nevertheless adequate ventilation is obtained in the front portion of the container.

A further important aspect of the floor structure resides in that a closed channel is arranged along the full length of the sidewalls of the container. The top wall of said channel has locally gaps 18, which prevent a drainage of too much air from the loading space directly along the sidewall 5 and the cargo.

For the same purpose is provided a cover plate 19 disposed transversely of the partitions 15 across the ends of the partitions remote from the channels 12. From FIG. 4 it will be apparent that the door of the container is reinforced on the inner side with ridges so that suction gaps are left between the cover plate 19 and the panel of the doors. As a matter of course, gaps may be provided in the cover plate as an alternative.

The cover plate 19 may furthermore be fastened pivotally on the edge facing the door to the bottom 4 of the container so that when the doors are opened the plate 19 can be tilted outwardly so that a loading floor for fork trucks or the like is formed.

It will be obvious that the channels 12 in a group 16 may be connected in a transverse direction by breaking away the adjacent intermediate walls or by piercing the same. In this way a stepped channel is formed, each step having an inlet opening (see FIG. 4). The associated partitions 15 are then in line with the outer wall of a step portion.

With regard to cleaning purposes the channels 12 may be open on their side facing the bottom 4 so that, when bottom portions are removed, the channels 12 can be cleaned.

The channels 12 and the partitions 15 may be united to form section elements, which have to be arranged in a given order of succession, so that an array as shown in FIG. 2 is obtained. Each section may be tiltably fastened to the sidewall 5. In this way cleaning is facilitated, whilst no errors will be involved in the redisposition of the bottom sections.

It will be obvious that the invention is not limited to the embodiment described above. The channels may be formed in a manner differing from FIG. 3. Moreover, the channels may be radially arranged from one point in the loading space on the floor thereof, the guide partitions then having an appropriate shape and disposition.

The main point of the floor structure within the scope of the invention is that per surface unit of the floor, in the loaded state of the container, a uniform quantity of air is conducted away, which is ensured by acting upon the air pressure and air rate pattern. Obviously, the air may be wholly or partly replaced by another gas or gaseous mixture.

What is claimed is:

1. A container for transporting goods under a controlled environment, comprising in combination:
   an enclosed, generally box-like container providing a bottom wall, a top wall, opposite end walls and opposite side walls;
   partition means adjacent one end wall and defining a vertical space therewith;
   ventillation means for causing air to be inducted into the bottom of said vertical space and discharged at the top of said vertical space;
   a feeding channel communicating with said top of the vertical space and extending generally centrally along said top wall toward that other end wall remote from said partition means and terminating in a discharge opening adjacent the juncture between said top wall and said other end wall, whereby all of the air circulated by said ventillation means is discharged into the container space adjacent said juncture;
   floor means defining return flow passages communicating with said bottom of said vertical space for providing uniform temperature and humidity conditions throughout the cargo space of the container, said return flow passages having inlet openings remote from said one end wall to provide a majority of return air flow area adjacent said other end and
   said floor means comprises a plurality of groups of channels in which channels of each group are of different lengths to present inlet openings progressively more remote from said one end wall, and upstanding partitions forming extensions of those channels terminating short of said other end wall, which extensions extend to said other end wall.

2. A container as claimed in claim 1 characterized in that the groups of channels are spaced apart from one another and the proximal sidewalls of two adjacent groups are prolonged by one of said partitions.

3. A container as claimed in claim 2 characterized in that the separation wall of two adjacent channels of a group is provided with apertures.

4. A container as claimed in claim 3 characterized in that the array of the groups is specularly symmetrical with respect to the central, longitudinal plane of the container.

5. A container as claimed in claim 1 characterized in that a cover plate is arranged over the partitions near the ends remote from the channels.

* * * * *